United States Patent [19]

Thiennot

[11] Patent Number: 4,840,448
[45] Date of Patent: Jun. 20, 1989

[54] OPTICAL FIBER TRANSMISSION APPARATUS, IN PARTICULAR FOR SUBMARINE USE

[75] Inventor: Jean Thiennot, Gif-Sur-Yvette, France

[73] Assignee: Etat Francais Represente Par Le Ministre des Postes et Telecommunications-Centre National D'Etudes des Telecommunications, Issy Les Moulineaux, France

[21] Appl. No.: 178,986

[22] Filed: Apr. 7, 1988

[30] Foreign Application Priority Data

Apr. 14, 1987 [FR] France .................. 87 05306

[51] Int. Cl.$^4$ .................................................. G02B 6/28
[52] U.S. Cl. .................................................. 350/96.16
[58] Field of Search ................ 350/96.16; 455/601, 455/606, 612

[56] References Cited

U.S. PATENT DOCUMENTS 4,105,869  8/1978  Aveneau et al. ............. 179/15 BD
4,680,809  7/1987  Hartkopf et al. ............. 455/601

FOREIGN PATENT DOCUMENTS 0190662  8/1986  European Pat. Off. .

OTHER PUBLICATIONS

IBM Technical Disclosure Bulletin, vol. 22, No. 8B, Jan. 1980, pp. 3815–3816, New York; F. Gfeller et al.: "Local Area Fiber-Optic Broadcast Network".
British Telecommunications Engineering, vol. 5, No. 2, Jul. 1986, pp. 177–182, London, Great Britian; J. M. Horne et al.: "Network Planning: The New Opportunities Created by Submarine Optical-Fibre Systems".
Patent Abstracts of Japan, vol. 8, No. 285, (E-287), [1722], Dec. 26, 1984; & JP-A-59 151 543, (Toshiba K.K.), 30-08-1984.

Primary Examiner—William L. Sikes
Assistant Examiner—Robert E. Wise
Attorney, Agent, or Firm—Foley & Lardner, Schwartz, Jeffery, Schwaab, Mack, Blumenthal & Evans

[57] ABSTRACT

An optical fiber cable transmission apparatus includes repeater-interchanger modules each of which includes at least one interchange module or pair of drop and insert switches. The module is such that a drop switch and an insert switch are provided between a line input and a line output with the second input of the insert switch coming from a buffer memory. Both switches are controlled by a common synchronizing circuit. A symmetrical arrangement is provided for the other drop and insert switch. Transmission takes place at a high data rate, and the interchange module serves to extract low data rate segments from each frame relating to a first stream and to replace them with same data rate frame segments relating to another stream. This arrangement makes it possible to distribute an "underwater multiplexing" function, i.e. to reconfigure traffic over a plurality of such repeater-interchangers.

35 Claims, 14 Drawing Sheets

OPTICAL FIBER TRANSMISSION APPARATUS, IN PARTICULAR FOR SUBMARINE USE

The invention relates to optical fiber transmission, and mainly but not exclusively to submarine transmission.

BACKGROUND OF THE INVENTION

The various optical fibers contained in a single submarine cable need not necessarily all have the same starting point or the same destination. Underwater "branching units" are therefore provided for interconnecting a plurality of cables in order to constitute a submarine network providing the desired point-to-point links.

Such an underwater branching unit may additionally contain:

opto-electronic regenerators for amplifying the optical signals transiting along the fibers;

remote surveillance devices for monitoring the regenerators and serving to locate possible faults; and remotely controlled switching devices acting either optically between fibers or else electrically between regenerators, for example to divert signals if a normal path is down.

All of this assumes that an electrical power supply accompanies the optical cables.

Remotely controlled electrical switching devices are added thereto in order to modify the configuration of the remote power supply circuit in the event of an untimely local break therein.

These arrangements are going to be used for the so-called TAT8 transatlantic link which is to be laid in 1988.

Although known solutions are of sufficient reliability, they do not give entire satisfaction under all configurations. In order to optimize the utilization of each optical fiber, it is desirable to perform "underwater multiplexing" making it possible to distribute traffic conveyed by a single incident fiber to a plurality of destinations, and vice versa.

Such multiplexing may be synchronous. In which case the transmitted signal is at a high data rate and is locked to a single clock rate defined by a master clock. The signal is given an appropriate frame structure and may optionally have a line code which is suitable for transmission through regenerators, or which is intended to facilitate the remote surveillance of the regenerators.

The framing and the line code may be applied to the signal at land-based transmission stations. In outline, such stations receive N quasi-synchronous digital input streams, synchronize the streams by adding a suitable number of bits, and then combine them with the frame structure (and optionally the line code) suitable for obtaining the high data rate signal to be transmitted. The signal is constituted by a sequence of "segments" each corresponding to one of the input streams, and it includes synchronizing elements enabling the segments to be identified.

The underwater multiplexing operations may be performed electrically in modified branching units.

In a "parallel" scheme, each incident fiber is connected to a N-outlet demultiplexer; each outlet fiber is connected downstream from a N-inlet multiplexer; a fixed or reconfigurable matrix defines the transfer relationship between the N demultiplexer outlets and the N multiplexer inlets.

In another scheme, which is referred to herein as a "serial" scheme the basic component is a drop and insert switch. Such a switch extracts all of the segments corresponding to a given stream from the high data rate signal, and replaces them by segments coming from another stream. One or more intermediate storage memories need to be provided. Finally, in addition to the appropriate number of drop and insert switches for establishing all of the desired interchanges between the base streams (up to N per pair of fibers), the complete equipment requires a distribution matrix for defining these interchanges exactly.

Whichever one of these two schemes is used, the resulting branching unit is complex. In addition to the complexity due to the underwater multiplexing equipment per se, it is also necessary to provide regenerators, remote surveillance devices associated therewith, and remote power supply electrical switches (which are difficult to install anywhere else). Further remote control and remote surveillance devices need adding for the underwater multiplexing equipment itself. All of this must be provided with the redundancy required by the underwater location. Finally, device must be provided which is capable of by-passing the underwater multiplexing equipment in the event of a fault, in order to maintain traffic.

All of this presents a considerable problem both for technical and for economic reasons.

Technically, the assembly is difficult to design and build in the form of a housing that can be handled at sea; account must be taken of the danger of interference between the subassemblies and this danger is made worse by the high data rate and by problems of heating and energy dissipation. It may also be observed that there are considerable differences in potential between subassemblies, since a large number of circuits are powered using a limited remotely fed current, and the architecture of the remote power supply system requires considerable dielectric insulation which is not very compatible with obtaining low thermal impedance.

Economically, such apparatus would need to be designed on a case-by-case basis for each application. Economies of scale could only be expected for the basic components, but never for the complete apparatus, and this drawback would apply from the drawing board all the way to the stocks required for maintenance purposes.

The present invention provides a solution to this problem.

SUMMARY OF THE INVENTION

The invention thus relates to an optical fiber cable transmission apparatus, in particular for submarine use.

The invention makes use of interchange modules theoretically capable of being constituted by drop and insert switches, and themselves constituting electrical members for transferring data between fibers, which members are suitable for extracting segments relating to a first group of signal streams from the framing of the useful signal and replacing them by segments relating to a second group of signal streams.

The apparatus in accordance with the invention comprises repeater-interchanger modules disposed along a multi-fiber cable, each comprising at least one interchange module advantageously constituted by a pair of drop and insert switches associated with synchronizing means, and suitable for interchanging frame segments between at least two selected fibers of said cable, together with regenerator means for all of the fibers in the cable and for providing the other normal functions of a repeater, with the entire apparatus being enclosed in a housing analogous to a repeater housing, thereby enabling an "underwater multiplexing" function to be distributed, i.e. enabling traffic to be re-configured as it passes through a plurality of such repeater-interchangers.

The two fibers subjected to an interchange may be same-direction fibers or opposite-direction fibers.

Preferably, an interchange module or its pair of drop and insert switches is at rest so long as synchronization has not been established.

Advantageously, the interchange module or its pair of drop and insert switches can be short-circuited on command by parallel direct paths.

It is also advantageous to provide a given set of fibers with another interchange module or with a further pair of drop and insert switches which are redundantly switchtable to replace the first module or pair of switches.

Another aspect of the invention relates to a repeater-interchanger equipped with at least one pair of redundant fibers arranged to allow signals transitting along at least some of the other fibers to be diverted over the redundant fibers, in particular by means of a diversion matrix. In such a repeater-interchanger, the inputs-outputs of one of the interchange modules or of one of the pairs of drop and insert switches are switchable to a same direction redundant fiber.

Other aspects of the invention relate to synchronization. Synchronization may be performed by means of at least one branching unit suitable for duplicating an incident signal towards two different stations, which then both receive the same clock frequency.

In order to keep communications secret, it is advantageous to provide at least one repeater-interchanger module in the vicinity of a branching unit for the purpose of extracting the messages which do not concern the designation station and replacing them by a pure clock signal.

A variant tending to satisfy the same purpose consists in having the signal from one station retransmitted to said station, after storage, at a clock frequency derived from another station.

In this case, it is advantageous for the retransmission to the same station to be performed after the signal has passed through the repeater-interchanger modules which provide message interchanges with two other stations.

At the transmission stations, it is common practice to multiplex a plurality of quasi-synchronous digital streams, i.e. streams whose clock frequencies are close but not synchronous. Their bit rates d (e.g. 34 Mbit/s) are preferably at a low level in a standardized bit rate hierarchy, with the highest level D being the high transmission data rate over the fibers (e.g. 560 Mbit/s). During multiplexing, a suitable number of bits are added, where necessary, to the bit streams in order to make them synchronous, as already mentioned. In this case, the structure of the high bit rate frame can be directly split up into low level streams.

However, the frame structure may be designed to have intermediate level segments at 140 Mbit/s, for example.

In this case, the interchange modules or the drop and insert switches operate on these data segments relating to a transmission rate which is intermediate between the high rate and the base rate of the digital streams.

Such interchange modules or drop and insert switches operating at an intermediate rate may be connected in parallel with another interchange module or another pair of drop and insert switches operating at base rate.

In accordance with another aspect of the invention, the apparatus includes in the vicinity of a landing branching unit, and on the sea side thereof, a length of fiber and an intercontinental fiber which are respectively connected by the branching unit to two different land stations, together with at least one repeater-interchanger module connected between the length of fiber and the intercontinental fiber.

In the same spirit, the apparatus may include at least one branching unit suitable for duplicating the incident signal to two different stations both of which then receive the same clock frequency.

In order to keep communications secret, at least one repeater-interchanger module is provided in the vicinity of the branching unit for extracting those messages which do not concern the destination station and replacing them with a clock signal.

In a variant, the signal coming from one station is returned to said station, after storage, at a clock frequency taken from another station.

Better still, such a return to the same station may be performed after the signal has passed through repeater-interchanger modules which interchange messages with two other stations.

BRIEF DESCRIPTION OF THE DRAWINGS

Embodiments of the invention are described by way of example with reference to the accompanying drawings, in which:

FIG. 2 is a block diagram of an interchange module included in a repeater-interchanger in accordance with the invention in the case where the two fibers concerned are opposite-direction fibers whereas

FIG. 17 shows a method of resynchronizing digital data from a station, whereas

FIG. 19A is a diagram of a desired interconnection between four stations, whereas

Figure 1:
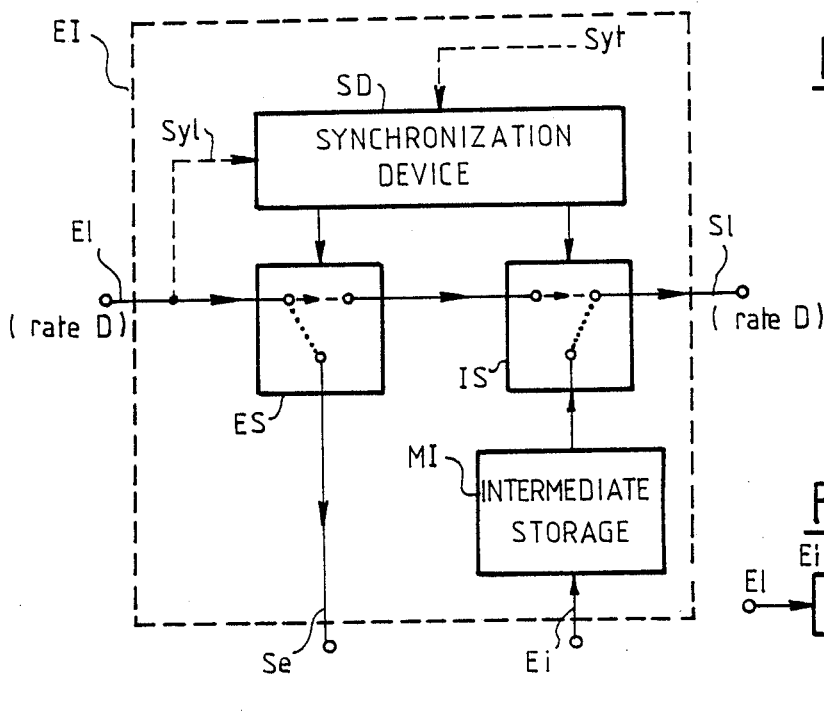
FIG. 1 is a block diagram of a drop and insert switch used for the invention.

For the most part, the accompanying drawings include information which is definitive in nature. Consequently, they may serve not only for facilitating understanding the following description, but may also contribute to the definition of the invention, where appropriate.

MORE DETAILED DESCRIPTION

Various conventions and symbolic representations are used in the drawings. They are explained as they occur. It is specified at this point, that the term "fiber" is used herein not for an optical fiber in the physical sense of the term, but for a continuous sequence of fibers including repeaters and other electrical regenerator devices suitable for ensuring transmission from one station to another. When a fiber does not go from one station to another, the term "length of fiber" is used.

Further, the digital transmissions referred to in the description below are assumed to be at the high nominal bit rate D of the submarine transmission network.

FIG. 1 shows a drop and insert switch referenced EI. Input El at data rate D is applied to a drop switch ES having a normal output illustrated by a dashed line and having a drop output illustrated by a dotted-line. The drop output delivers a signal Se which is one of the outputs from the drop and insert switch EI.

The direct output from the drop switch ES is applied to one of the inputs of an insert switch IS. This input, which constitutes the normal path, may be transmitted as indicated by the arrow on a dashed line to the line output at data rate D, referenced Sl. However, the output Sl may also be supplied, in insert mode, from the other input to the switch IS, as illustrated by the dotted line arrow. This other input is connected to the output from an intermediate storage memory MI whose input is connected to the input Ei of drop and insert switch EI.

Within the response time of the circuits, the two switches ES and IS operate synchronously, i.e. either both of them are connected to the direct or "through" path interconnecting input El to output Sl, or else they are in the drop and insert positions respectively in which case input El is connected to output Se and input Ei is connected to output Sl. The two switches ES and IS are switched synchronously by means of a synchronization device SD. It is also necessary for this control signal to be synchronized with the frame of the high data rate signal D. It is desired that specific segments should be dropped from the high data rate signal D, with said segments corresponding to a particular stream, and similarly it is desired that specific segments should be inserted from some other stream coming via input Ei. The memory MI performs a buffer function enabling intermediate data to be stored in sufficient quantity to compensate for the fact that there is no reason for the insertion data to have any rigid time synchronization with the data that is dropped.

The required synchronization on the segments contained in the line signal may be provided either locally, as illustrated by the dashed line Syl connected to input El, or else externally as illustrated by the other input Syt to the synchronization device SD.

Under local synchronization, merely examining the input signal suffices to detect the frame segments. Suitable control codes suffice to ensure that the frame segments to be dropped can be identified. The person skilled in the art knows that both functions can be performed under remotely-controlled synchronization.

Figure 1A:
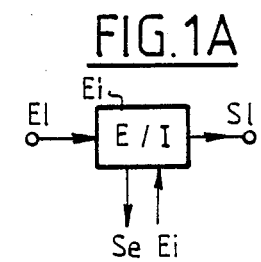
FIG. 1A defines a symbolic representation of such a switch as used in the other figures.

FIG. 1A shows the symbol used to represent the FIG. 1 block in most of the other figures.

Figures 2A, 2B:
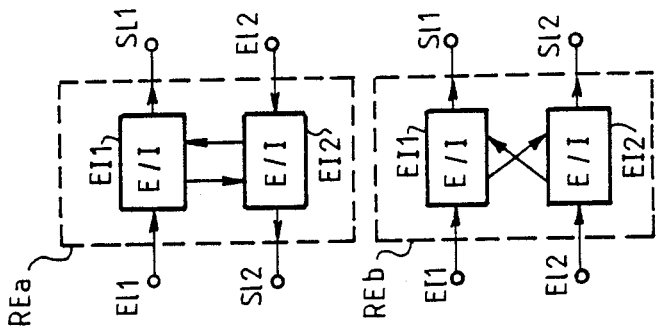
FIGS. 2A and 2B are respective symbolic representations of such a repeater-interchanger, with FIG. 2A applying to the case where the two fibers are opposite-direction fibers and FIG. 2B applying to the case where the fibers are same-direction fibers.
Figure 2:
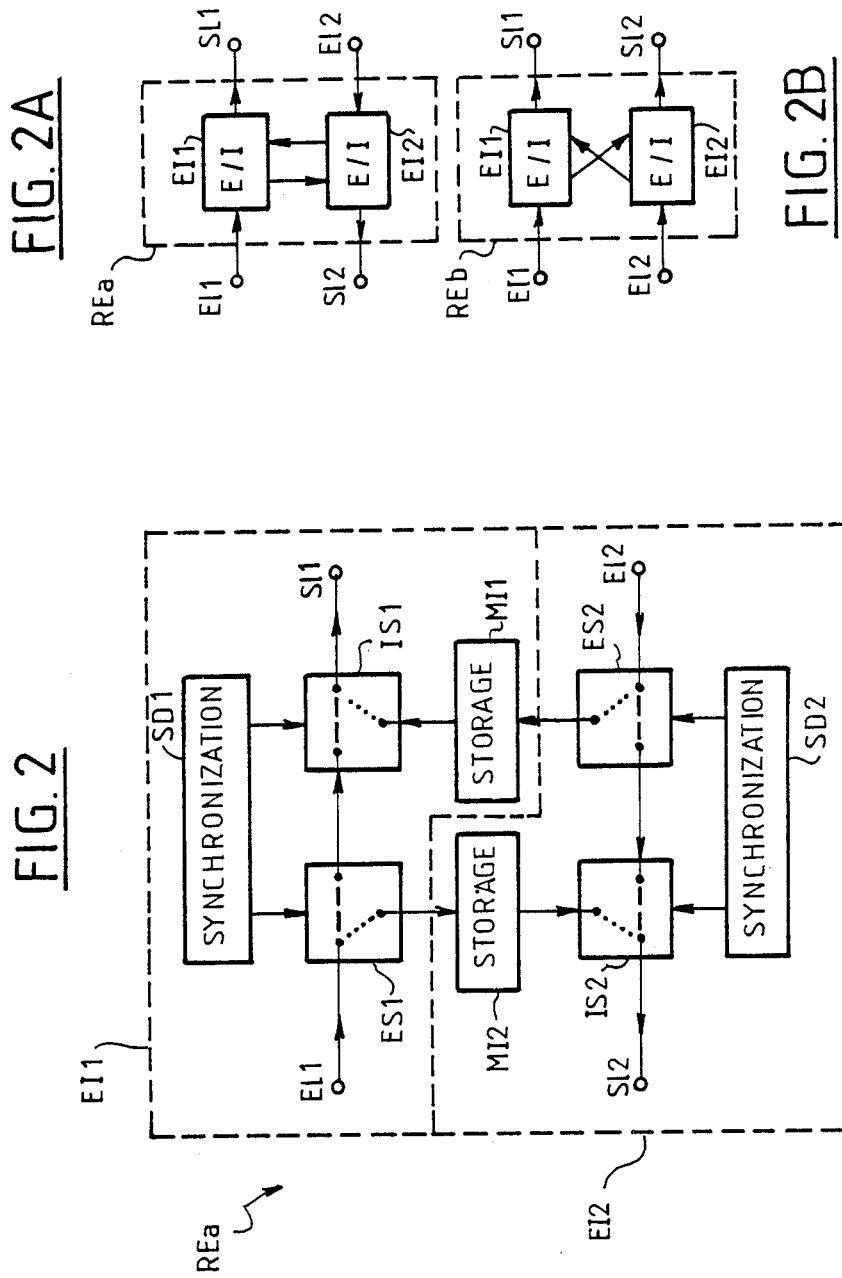

FIG. 2 shows the principle of an interchange module comprising a pair of drop and insert switches EI1 and EI2 connected between two opposite direction fibers. The first fiber runs from input El1 to output Sl1 while the second fiber passes from input El2 to output Sl2. Each of the two drop and insert switches has a respective synchronization device SD1 or SD2. Synchronization may be performed, for example, respectively on input El1 and on input El2. The physical embodiment of the interchange module may be constituted by a single electrical circuit with the different portions shown not being physically separated. In the following description, the term "pair of" or "two" "drop and insert switches" refers to such an assembly.

Such a device, together with opto-couplers and transmit and receive amplifiers (not shown in FIG. 2) and means for performing associated functions of remote surveillance, remote power supply, protection, etc. . . . , within a repeater and located inside an appropriate mechanical housing, constitutes a "repeater-interchanger" and is referenced herein as REa.

FIG. 2A shows a symbolic representation of a repeater-interchanger RAe operating between two opposite direction fibers. FIG. 2B shows a symbolic representation of a repeater-interchanger REb operating between two same direction fibers.

Figure 3A:
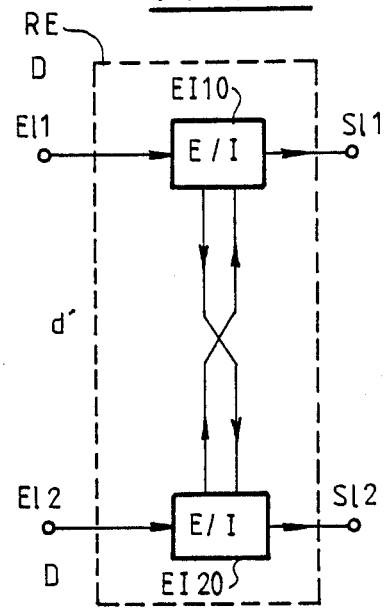
FIGS. 3A and 3B show two variant interchange modules included in a repeater-interchanger, for the case where an intermediate level data rate is used.
Figure 3B:
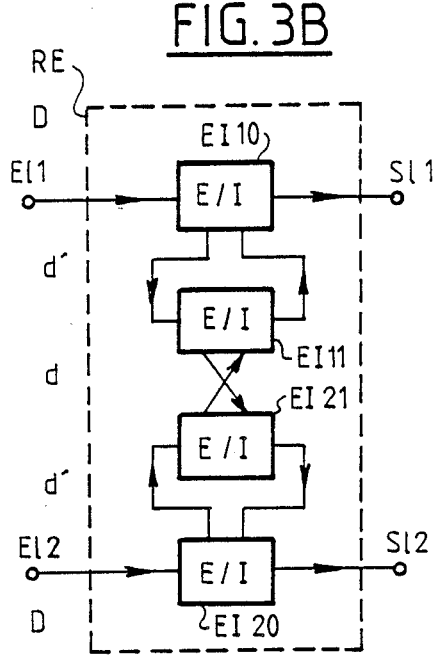

FIGS 3A and 3B relate to the case where intermediate data rates are to be operated on.

FIG. 3A simply shows that two drop and insert switches EI10 and EI20 can be caused to operate at a data rate d' which lies between the high transmission data rate D and the low data rate d of the individual streams.

FIG. 3B shows that two drop and insert switches EI10 and EI20 can be used operating at the intermediate data rate d', and can themselves feed two other drop and insert switches EI11 and EI21 which, operate at the low data rate d.

Apparatuses in accordance with the invention are implemented when the signals are available in electrical form rather than in optical form, which applies to the fibers per se. This condition obtains within the repeater-interchangers.

Figure 4:
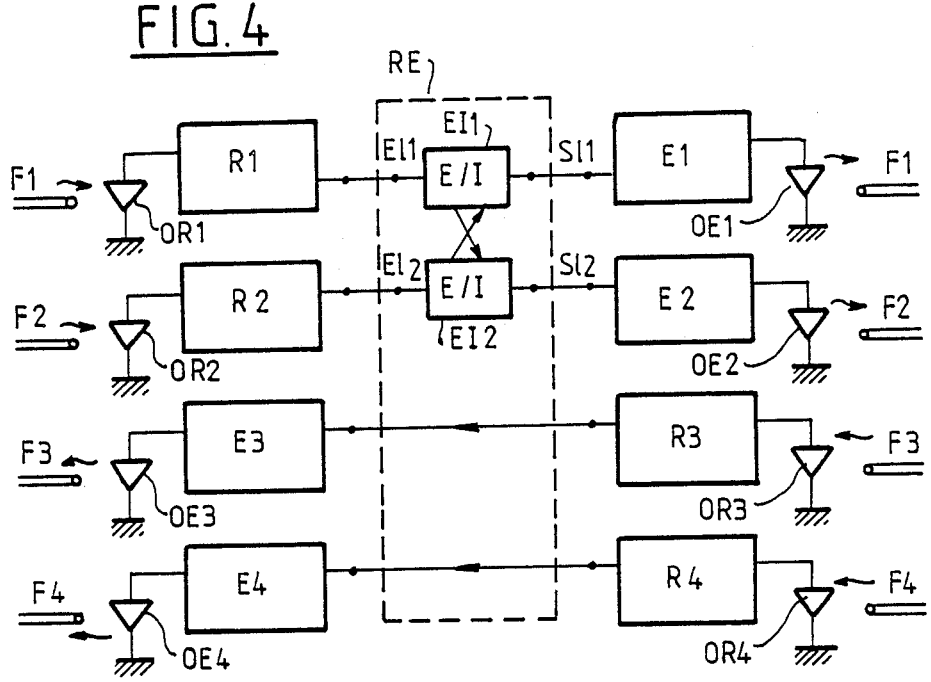
FIG. 4 shows a first embodiment of a repeater-interchanger in accordance with the invention.

FIG. 4 shows one such repeater-interchanger. Two fibers F1 and F2 provide transmission from left to right. Two other fibers F3 and F4 provide transmission from right to left.

The optical signals from the fibers F1 and F2 are applied to respective receive opto-couplers OR1 and OR2 followed by receive amplifiers R1 and R2. Correspondingly transmit amplifiers E1 and E2 provide signals to transmit opto-couplers OE1 and OE2 which forward their respective signals to downstream fibers F1 and F2.

The same arrangement is provided for fibers F3 and F4, but going from right to left.

In the description of the invention. it is assumed that the receive amplifiers R are physically separated from the transmit amplifiers E. Access to the electrical signals is often possible between the send and receive portions of a regenerator. Such access is generally provided when the regenerators are designed since it is often necessary to make use of such access to independently calibrate the transmit and receive portions, and also because other equipment may be connected thereto, for example a device for looping a link back on itself for locating defects, or an inter-regenerator switching matrix for systems provided with redundancy, as explained below.

The invention is implemented by inserting pairs of mutually coupled drop and insert switches between two fibers, with such a regenerator.

Thus, in FIG. 4, the output from amplifier R1 constitutes the input EI1 of switch EI1, whose output SI1 constitutes the input to amplifier E1. The same circuit applies to drop and insert switch EI2 between amplifiers R2 and E2. The two switches EI1 and EI2 have cross connections (FIG. 2B) since the fibers are same-direction fibers.

In a practical embodiment, the above-mentioned accesses are not necessarily physically provided since, if the embodiment is to be optimized, the set of functions is not always constituted by juxtaposing clearly distinguished circuits.

In FIG. 4, the other two fibers F3 and F4 are directly transmitted between the receive portions R and the transmit portions E.

In a variant (FIG. 5) two other drop and insert switches EI3 and EI4 are provided enabling segments to be interchanged between the fibers F3 and F4 in the same manner as they can be interchanged by EI1 and EI2 between fibers F1 and F2.

Figure 6:
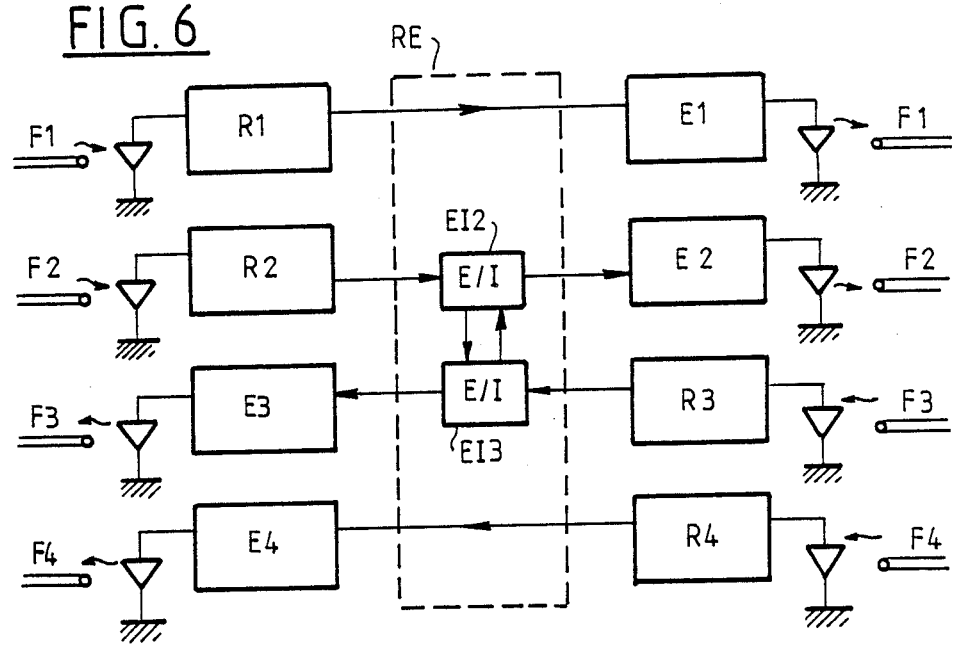
FIG. 6 shows a third embodiment of a repeater-interchanger in accordance with the invention.

In FIG. 6, the drop and insert switches EI2 and EI3 are mounted, in this case, between two opposite direction fibers F2 and F3, so they are represented as shown in FIG. 2A.

Figure 7:
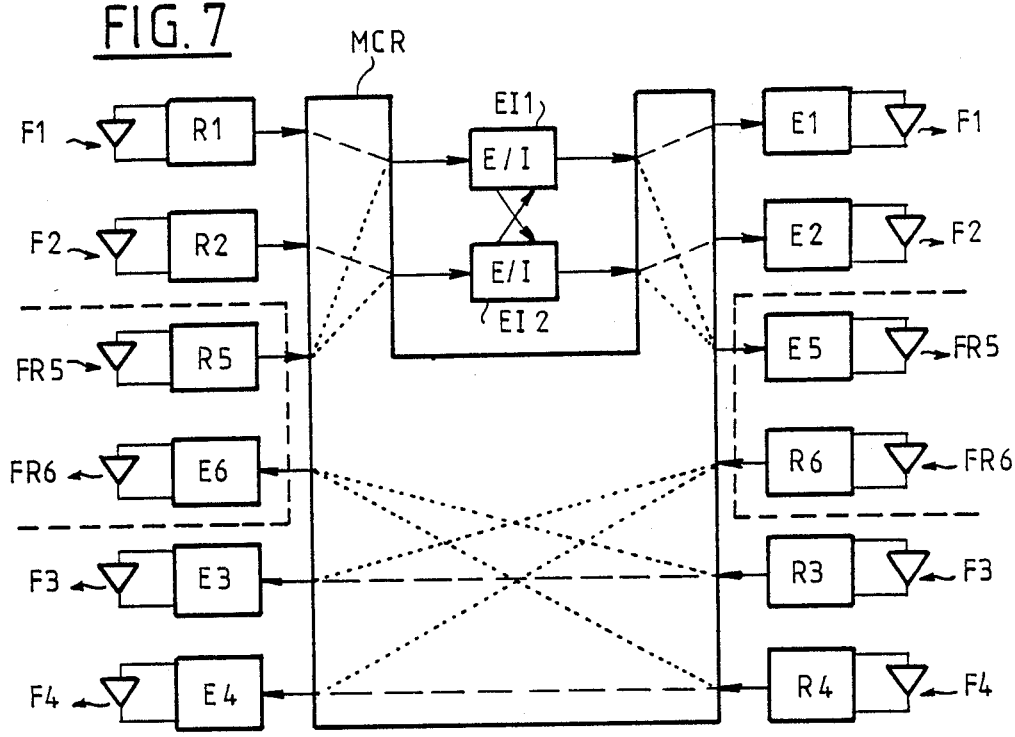
FIG. 7 shows a fourth embodiment of a repeater-interchanger in accordance with the invention, where it is incorporated in apparatus including a diversion switching matrix for use in conjunction with at least one pair of redundant fibers.

FIG. 7 shows a regenerator fitted in accordance with the invention, but having a more complex structure. Compared with FIGS. 4, 5, and 6, there are two additional fibers FR5 and FR6 for providing redundancy, i.e. to enable transmission to continue even if other fibers become defective. The fibers FR5 and FR6 are opposite direction fibers.

Using the same convention as above, the normal paths are shown in dashed lines, while the variant paths provided for redundancy purposes are shown in dotted lines. Switching is provided by means of a switching and diversion matrix MCR of conventional form.

The person skilled in the art will understand that under normal conditions, the device shown in FIG. 7 operates in the same way as the device shown in FIG. 4.

However, one or other of the fibers F1 and F2 may be replaced by redundant fiber FR5. Similarly, if one or the other of the fibers F3 and F4 is defective in the downstream direction, then the upstream signals may be taken up by redundant fiber FR6. If one or other of the fibers FR3 and FR4 is defective upstream, then its signal passes over fiber FR6 and may be reapplied in the downstream direction over a section of the appropriate fiber.

Figure 5:
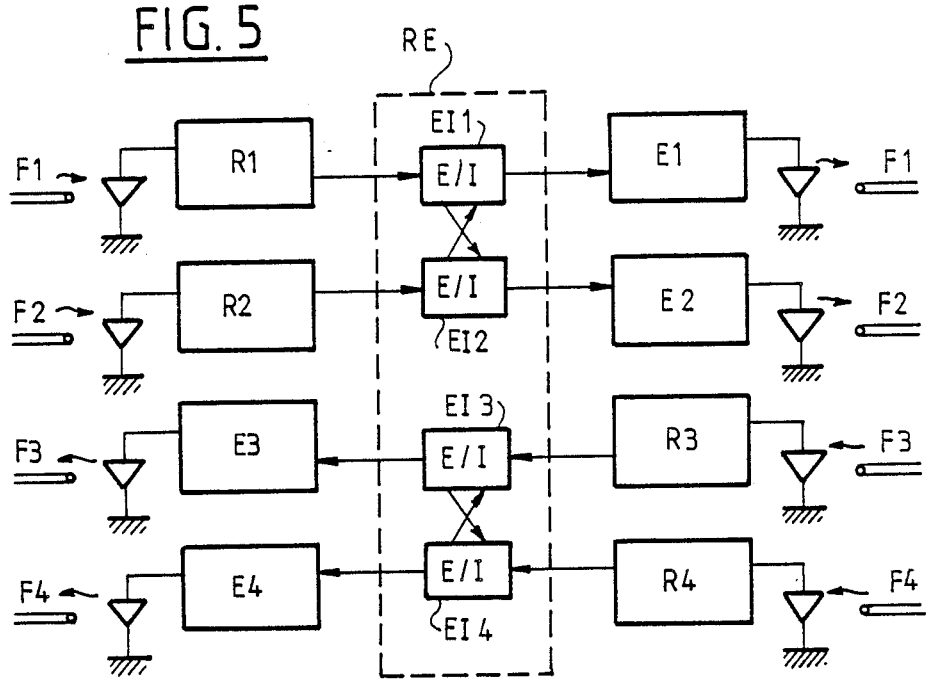
FIG. 5 shows another embodiment of a repeater-interchanger in accordance with the invention.

It is also possible to make a repeater-interchanger whose normal state operation is similar to that of the apparatuses shown in FIGS. 5 and 6, by inserting an appropriate number of interchange devices within the switching and diversion matrix MCR. These variants are not shown, but they can easily be derived by the person skilled in the art.

Because of space and power consumption considerations, it is simpler to install a single interchange module (only one pair of drop and insert switches) within a given repeater, as shown in FIG. 4. However, there are advantages in other configurations, in particular those shown in FIGS. 5, 6, and 7.

Unless otherwise specified, the following description relates to a repeater-interchanger containing a single interchange module.

It is essential for submarine links to have very high reliability. They must therefore be provided with means for circumventing possible defects in an interchange device so that traffic can continue to pass through a "repeater-interchanger" even if its interchange device is no longer operative. There are several different ways in which this can be done.

Figure 8:
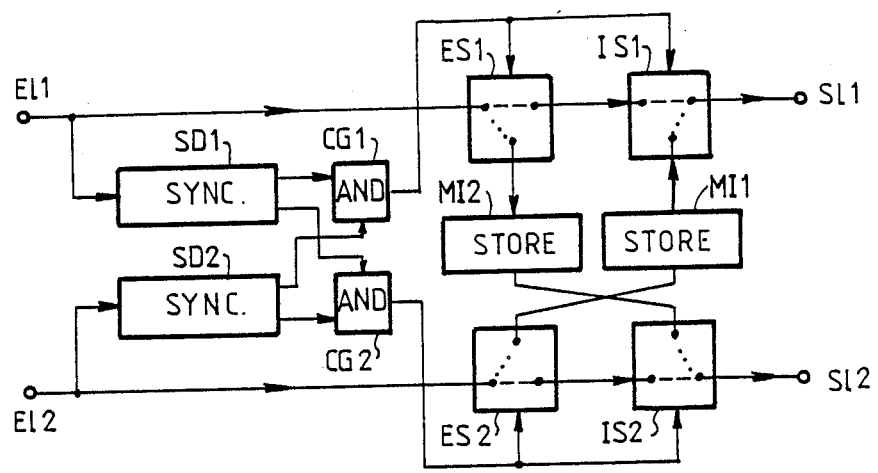
FIG. 8 shows a first method of synchronizing apparatus in accordance with the invention.

In FIG. 8, the drop and insert switches ES1, IS1, ES2, and IS2 are made "transparent" to signals at data rate D so long as they cannot be synchronized on the low data rate d signals which they are to extract. This synchronization then takes place internally by recognizing the message to be dropped.

Thus, synchronization circuits SD1 and SD2 are respectively connected to inputs EI1 and EI2. However, the output from synchronization circuit SD1 can only be applied to switches ES1 and IS1 when AND gate CG1 provided for this purpose receives a signal confirming that synchronization has also been acquired at the other synchronization circuit SD2. AND gate CG2 performs the same function for the link between synchronization circuit SD2 and the switches ES2 and IS2.

Figure 9:
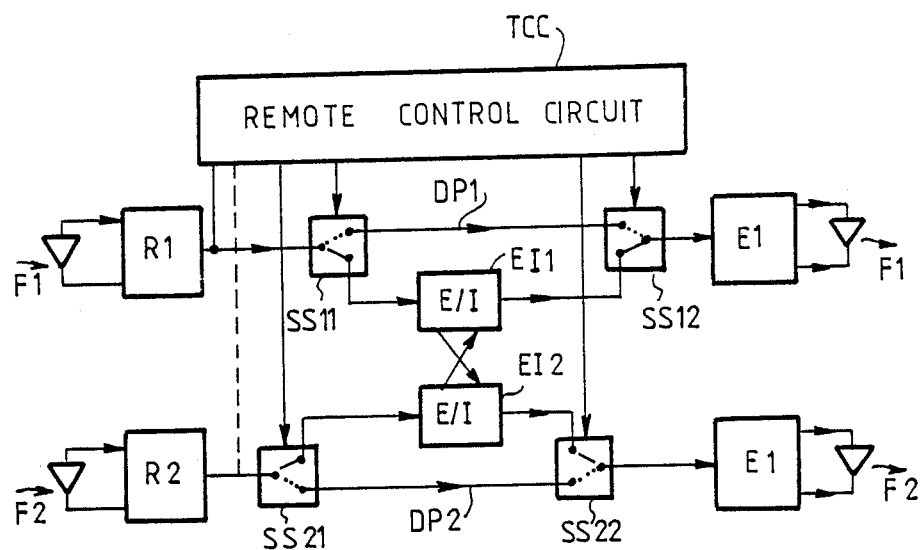
FIG. 9 shows a second method of synchronizing apparatus in accordance with the invention, together with security means for providing transmission in the event of a fault.

FIG. 9 shows another security item, which is not incompatible with the above item. The interchange device constituted by the pair of drop and insert switches EI1 and EI2 is surrounded by four security switches SS11, SS12, SS21, and SS22. The output from amplifier R1 relating to fiber F1 is applied to the input of switch SS11 which can connect the signal either to switch EI1 (normal mode) or else over direct path DP1. At the other end, the output from switch EI1 is returned to the normal path of security switch SS12, whose other input is connected to the direct path DP1, and whose output goes to transmit amplifier EI1.

The same connections are provided for the other drop and insert switch EI2.

The assembly is controlled by a remote control circuit TCC which ensures that the four switches SS11, SS12, SS21, and SS22 are appropriately switched together so that they are either all of them in their normal paths connected to the drop and insert switches EI1 and EI2, or else they are all of them on their direct paths DP1 and DP2.

The remote control signal per se may come either from upstream fiber F1, as shown by a continuous line, or else from upstream fiber F2, as shown by a dashed line.

Figure 10:
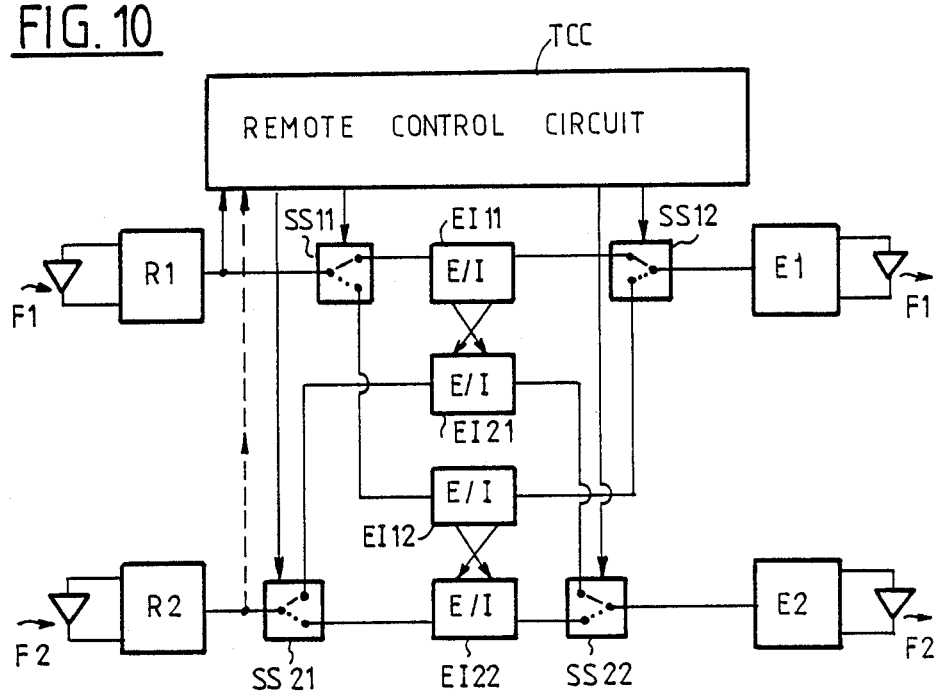
FIG. 10 shows another method of providing synchronization and security in the event of a fault.

FIG. 10 shows an improved variant of FIG. 9. A glance at this figure will show the person skilled in the art that the direct paths have been replaced by another pair of drop and insert switches, which are coupled together in the appropriate direction for pairs of same-direction fibers. This is a parallel connection which is otherwise fundamentally the same as that shown in FIG. 9.

Figure 11:
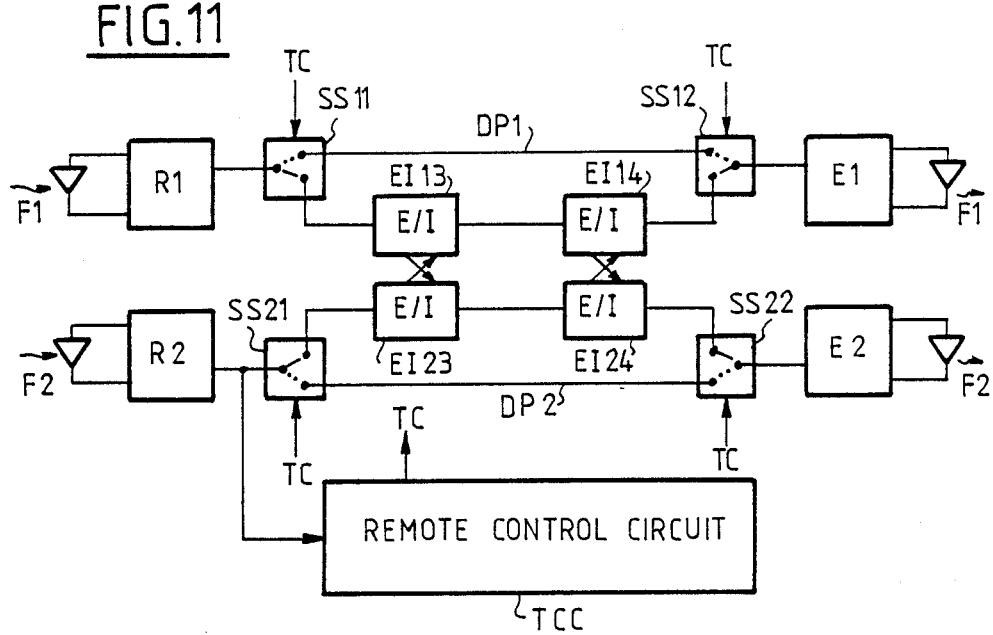
FIG. 11 shows yet another method of providing synchronization and security.

In FIG. 11, security is obtained by a series connection of two pairs of drop and insert switches respectively EI13 & EI23 and EI14 & EI24. For fiber F1, the switches SS11 and SS12 serve to select between the direct path DP1 or the cascade connection of members EI13 and EI14. The same applies to fiber F2, with security switches SS21 and SS22 switching between the direct path DP2 and the cascade of members EI23 and EI24.

Synchronization may be internal for each pair of drop and insert switches as already described with reference to FIG. 8. In this case, the pair of drop and insert switches which synchronizes first will then continue to remain in operation.

In a variant which is currently considered as being the preferred variant, the pair of drop and insert switches to be operated is selected under remote control. The use of such remote control makes it possible to put into service direct parallel paths in the other regenerator interchangers that can act on the same signals.

Other variants are described below, with reference, in particular, to FIGS. 25 and 26.

Figures 12, 13:
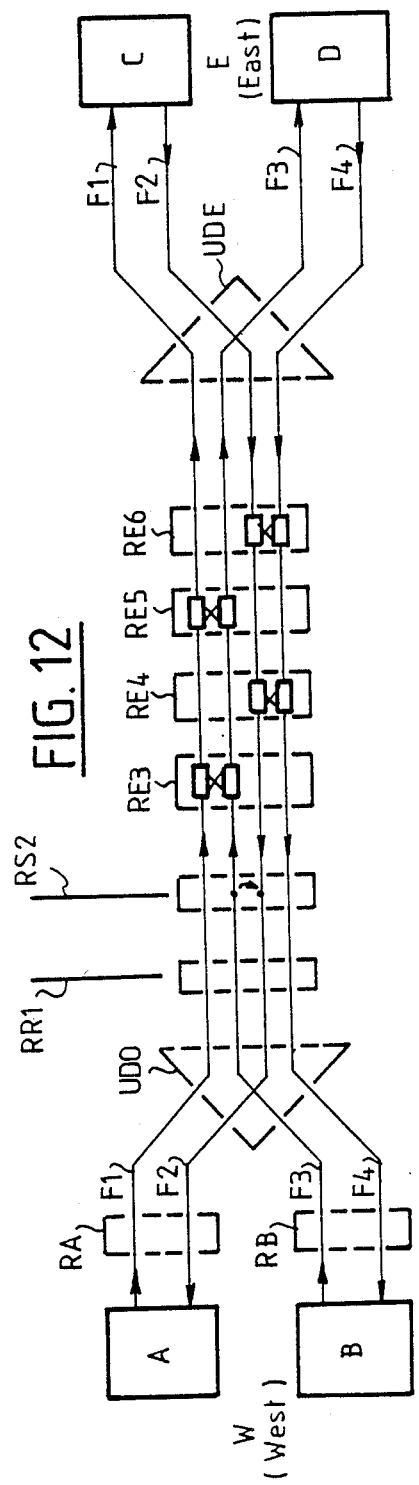
FIG. 12 shows an embodiment of a transmission network using means in accordance with the invention.
FIG. 13 is a diagram showing another network implementing the invention.

FIG. 12 shows, by way of example, a first application of the invention in providing a submarine network using repeater-interchangers.

By convention, stations A and B situated to the left of the figure are referred to as being West stations W. Symmetrically, stations C and D situated to the right of the figure are referred to as East stations, E.

Two fibers F1 and F2 provide both-way transmission between stations A and C. Two fibers F3 and F4 provide both-way transmission between stations B and D. At a West branching unit referenced UDO, the fibers F1, F2, F3, and F4 are brought together to define the submarine cable. Conversely, at the East end of the cable, branching unit UDE separates the fibers so that they go respectively to stations C and D.

An ordinary repeater RA is provided between station A and branching unit UDO. An ordinary repeater RB is provided in like manner between station B and the same branching unit UDO. A third ordinary repeater RR1 is provided immediately downstream from station UDO on the submarine cable.

It is followed by a synchronizing repeater RS2 which interchanges clock information between fiber F3 coming from B to go to D and fiber F2 coming from C to go to A. For clock rate purposes, it is assumed, for example, that the master station is station B. Station A can then by synchronized on station B via fibers F3 and F2. Station C is synchronized on station A via fibers F2 and F1. Finally, station D is synchronized on station B via fiber F3.

Naturally, the synchronization function could be provided in some other manner. Clock transfer may be provided not only in a synchronizing repeater, but alternatively in one of the branching units.

Each fiber conveys a signal at a high data rate D obtained by multiplexing N signals at a base data rate d. For example, if it is desired to transmit:
n1 base signals between A and C;
n2 base signals between A and D;
n3 base signals between B and C; and
n4 base signals between B and D;
then a set of inequalities will exist such that each of n1+n2, n3+n4, n1+n3, and n2+n4 is not greater than N.

Repeater-interchangers RE3, RE4, RE5, and RE6 serve to provide the desired interchanges for ensuring that not only are A and C interconnected in conjunction with B and D being interconnected as to be expected from the fibers, but also A and D are interconnected as are B and C.

In order to provide the above-mentioned interconnection, it is necessary to interchange n2 base signals travelling between A and D with n3 base signals travelling between B and C, and this interchange must be provided in both transmission directions. Since an interchange device operates on two base rate signals, it is necessary to provide k interchange devices where k is not less than the largest of the two integers n2 and n3, and this must be done for each transmission direction.

This can be achieved:
either by providing 2 k repeater-interchangers supposing that each of them contains only one interchange device, as shown in FIG. 4; or else
k repeater-interchangers if each of them contains two interchange devices as shown in FIG. 5.

If the direct optical fiber paths had been established between A and D and between B and C, then the number k would have been not less than the greater of the two numbers n1 and n4.

In practice, a configuration is chosen which minimizes the value of k. In this case, the number k need never be greater than N/2. If this configuration optimization is not performed, the number k nevertheless remains less than N.

The situation and the total number of repeaters (ordinary repeaters, synchronizing repeaters, and interchanging repeaters) shown in FIG. 12 are given purely by way of example. In practice, they depend, in particular, on the individual lengths of the various lengths of cable.

The diagram of FIG. 12 concerns a simple configuration which satisfies the following conditions:
the sum of the number of pairs of fibers in the incident branches at each end is equal to the number of pairs of fibers in the common submarine portion, where all of the fibers coexist in the same cable, and where interchanges can therefore take place; and the length of the common submarine portion is sufficient to receive the required number of repeater-interchangers.

This will not necessarily be true in practice. In particular, it is often a practical requirement to make use of redundant optical fibers. In this respect, FIG. 13 is a diagram of a network comparable to that of FIG. 12, but including redundancy. Stations A and B are connected by two pairs of fibers to the West branching unit UDMO. Stations C and D are likewise connected by two pairs of fibers to the East branching unit UDME. The submarine path also has two additional optical fibers for redundancy purposes.

In such a configuration, conventional redundancy switching matrices are provided in the branching units UDMO and UDME.

Likewise, the repeater-interchangers (reduced for diagrammatic purposes to two in this case) are fitted with redundancy switching matrices, for example as described above with reference to FIG. 7.

The case is now considered where the number of pairs of fibers in normal operation in the incident branches is greater than the number of pairs of fibers in normal operation in the common portion of the submarine cable.

Figure 14A:
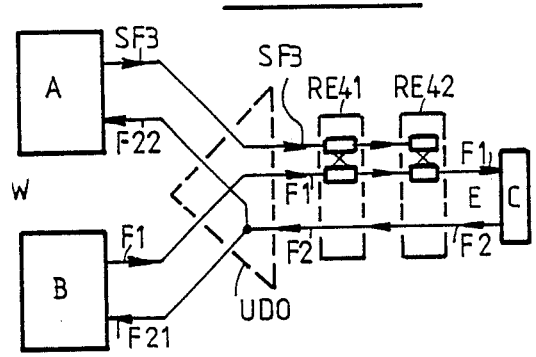
FIGS. 14A and 14B show two methods of providing signal interchanges and of passing clock information between two stations.

In FIG. 14A, two stations A and B at the West end communicate respectively in the East end by means of n1 and n2 base rate signals. The East end may be constituted by a single station C or by a plurality of stations.

If the sum n1+n2 is less than N, there is no point in providing more than one pair of fibers in the submarine cable going to the East end.

If n1 is, in this case, less than n2, the direct path is preferably established between station B and station C at the East. However, in order for it to be possible to provide interchange, it is essential for the transmit fiber from A to coexist in the same cable as the transmit fiber from B over a sufficient length to allow for an adequate number of repeater-interchanges to be inserted.

Figure 14B:
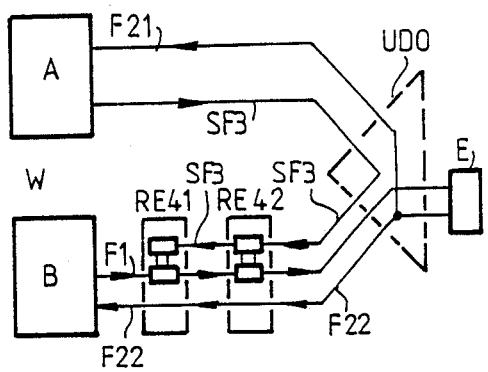

This may be done by adding a single fiber, either in the cable situated between the branching unit UDO and station C (FIG. 14A) or else in the cable situated between branching unit UDO and station B (FIG. 14B).

In order to provide the interchange, it suffices to have n1 repeater-interchangers, made as shown in FIG. 4 for the first case or as shown in FIG. 6 for the second case, in order to ensure that all of the required interchanges are provided in the West-to-East direction.

As for the other transmission direction, it suffices to duplicate the return signal (from C) at the branching unit UDO.

Figure 15:
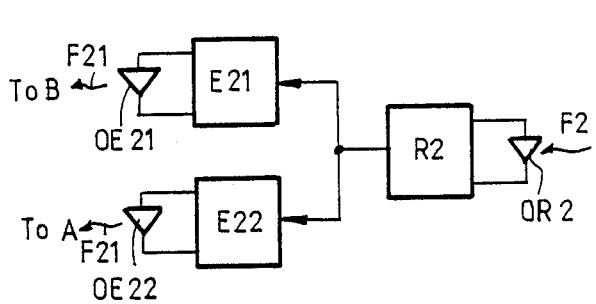
FIG. 15 shows a method of duplicating a signal to two downstream optical fibers.

This may be obtained by providing two send amplifiers E21 and E22 (FIG. 15) at the output from a single receive amplifier R2 which is coupled by a receive opto-coupler OR2 to the fiber F2.

Figure 15A:
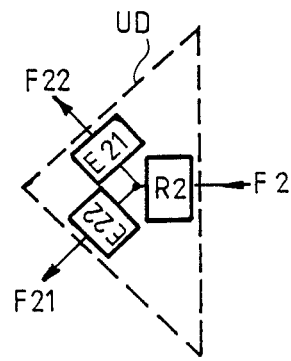
FIG. 15A shows a symbolic representation thereof used in other figures.

The respective output opto-couplers OE21 and OE22 of the amplifiers E21 and E22 feed two respective lengths of fiber F21 and F22 going to stations B and A. A conventional representation of such a circuit is shown in FIG. 15A.

The person skilled in the art will understand that this may also be performed by a simple optical coupler without amplification or regeneration. It may also be achieved in a repeater or in a repeater-interchanger, but at increased expense.

The duplication of the return signal also makes it possible to transmit a signal to the station A at a clock frequency which is determined by station B or station C. This facilitates synchronizing the multiplexing equipment situated at A relative to the general synchronization clock of the system.

In summary, as shown in FIG. 14A, signals transmitted from A leave over a length of fiber SF3 which, after passing through the branching unit UDO, passes through a sufficient number of repeater-interchangers such as RE41 and RE42 in order to pass all of the required information from fiber F1 towards station C.

In FIG. 14B, fiber SF3 returns towards station B after passing through the branching unit UDO in order to encounter repeater-interchangers RE41 and RE42 operating as above, but this time on the portion of fiber F1 which extends between the branching unit UDO and station B.

As for the return direction, a similar arrangement does not ensure that information is kept secret. Messages intended for B also appear at A, and vice versa.

Figure 16A:
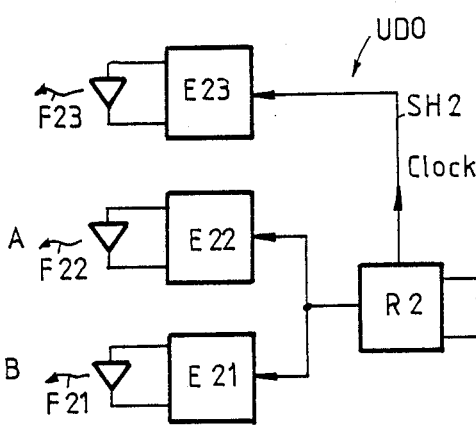
FIG. 16A shows a variant of FIG. 15.
Figure 16B:
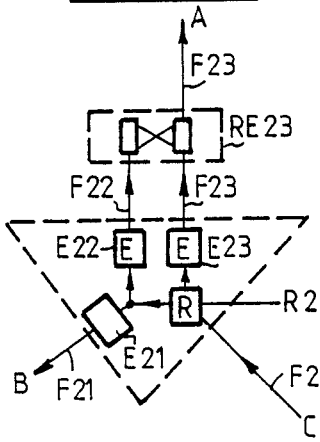
FIG. 16B shows another variant of FIG. 15 in more diagrammatic form.

One way of overcoming this problem is shown in FIGS. 16A and 16B.

In branching unit UDO, the signal on fiber F2 coming from C is duplicated as before in order to be transmitted over fiber F22 going to A. A clock frequency signal is also transmitted over fiber F23 without any message content, which signal is provided by the clock rate recovery circuit located in the receive amplifier R2 of the regenerator installed in the branching unit. This clock signal is referenced SH2.

FIG. 16B reproduces FIG. 16A in diagrammatic form within a triangle defining the branching unit UDO.

This figure also shows that by using repeater-interchangers such as RE23, it is possible to replace segments of pure clock signal SH2 by messages which are actually intended for A, and which exist on the fiber F22. Thus, in this case fiber F23 is directly connected to A over the normal path of a repeater-interchanger such as RE23. And these repeaters receive the fiber F22 in order to replace the clock signal by information intended for A.

The interchange devices of these repeater-interchangers RE23 may be remotely controlled, or else they may synchronize themselves on fiber F22 which is transmitting the duplicated signal.

It would also be possible to extend fiber length F22 as far as station A and to replace the signal segments intended for B by clock signals, however that would give rise to a greater number of repeater-interchangers if n1 is less than n2.

However, this configuration may give rise to practical problems for the repeaters since the signal obtained does not have the characteristics which are normally required, in particular with respect to line code, supposing that such a code is used in order to facilitate transmission through the repeaters or in order to facilitate remote surveillance thereof.

A variant which solves this problem is now described with reference to FIGS. 17 and 17A.

Figure 17:
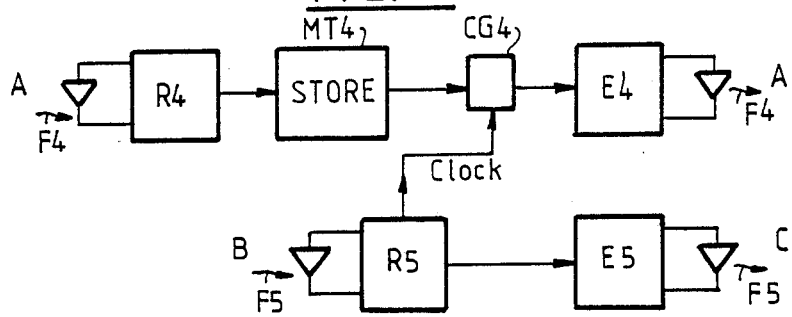

FIG. 17 is limited to a single fiber connecting B and C, in particular via receive amplifier R5 and transmit amplifier E5 of branching unit UDO. As above, receive amplifier R5 defines a clock signal.

The information leaving station A is received in branching unit UDO via a receive amplifier R4 followed by a storage memory MT4, then a gate CG4, for delivering the information stored in the memory MT4 at the clock rate coming from receive amplifier R5. This information is then received by transmit amplifier E4 which thus returns the same information to station A via the downstream portion of fiber F4.

This makes it possible to return station A's signal back to station A after synchronizing it on the message coming from B (or C). Station A thus receives clock information without requiring knowledge of any of the messages passing between the other two stations.

As before, the signal coming from station C is duplicated for transmission over a fiber going to A but not terminating at A. In comparison with FIGS. 14 et seq, this is fiber length F22. Repeater-interchangers (not shown here) are connected between the duplicated fiber length F22 coming from C and fiber F4 which, up till now, has returned its own signal back to A. Using these repeater-interchangers, messages intended for A are transferred between fiber length F22 and fiber F4.

There still remains the possibility of station B receiving messages intended for A. To avoid this, it is easy to provide a symmetrical structure which likewise returns to B either the clock signal (as in FIG. 16B) or else its own signal (as described above), while providing transfer by means of repeater-interchangers of the messages intended for B and coming from C.

Figure 17A:
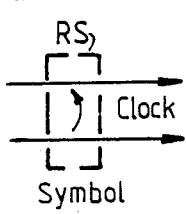
FIG. 17A shows the symbolic representation of this clock rate transfer.

It may be observed, in passing, that FIG. 17A shows a symbol used herein to indicate that clock information passes between two fibers, for example within a synchronous repeater RS.

Figure 18:
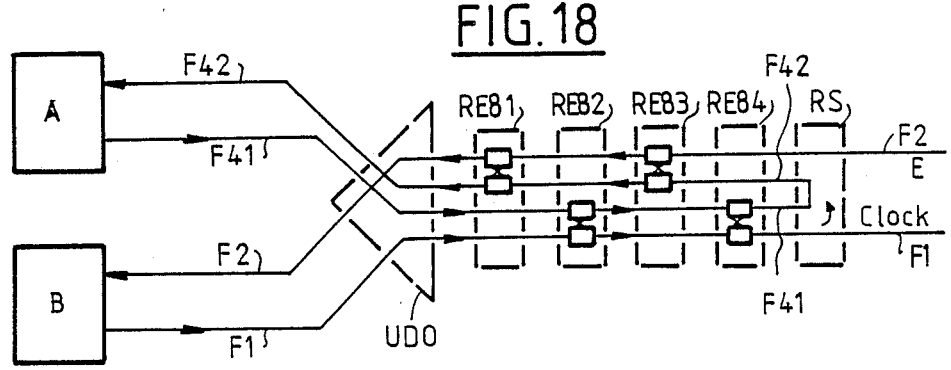
FIG. 18 shows a portion of a network between two stations in accordance with the invention.

FIG. 18 shows another, elegant method of solving the problem which consists in looping the fiber coming from station A back towards station A.

As in FIGS. 14A, 14B, and 16B, a station B is in communication over two optical fibers F1 and F2 with a station C situated at the other end, i.e. at the East.

Unlike the preceding versions, station A is provided, in this case, with a go fiber F41 which passes through branching unit UDO and cohabits with fibers F1 and F2 over a certain length thereof prior to returning via F42 to the same station A.

At its East end, this fiber F41-F42 is provided with a synchronizing repeater which passes clock information coming, for example from fiber F1.

Between the branching unit UDO and this synchronizing repeater RS, there are repeater-interchangers 81, 82, 83, and 84 for providing all of the desired interchanges between stations A, B, and C. More precisely, portion F41 enables signals coming from A to be transferred to fiber F1 that goes to C. Messages from station C for station A are transferred between fiber F2 and portion F42 of the fiber that is looped back on station A.

Figure 19A:
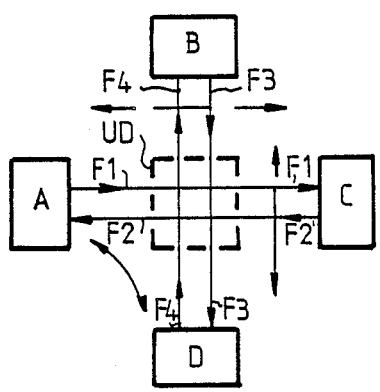

The person skilled in the art can now understand how the present invention provides distributed multiplexing of signals passing along optical fibers by means of a plurality of repeater-interchangers spread out along the cable. The number of repeater-interchangers required is determined by the number of messages to be interchanged. As a result, there is a minimum length of submarine cable in which the fibers must coexist. In practice, there is no a priori reason why this condition should always be satisfied. The general case where this condition is not satisfied is shown in FIG. 19A: two pairs of fibers F1 and F2 and two other pairs of fibers F3 and F4 respectively interconnect stations A and C and stations B and D. These fibers cross one another in a single branching unit UD which interconnects four submarine cables.

The person skilled in the art knows that it is preferable from the point of view of the operations that must be performed at sea to provide two branching units which are very close together, for example which are at a distance apart that is of the same order as the average spacing between repeaters. Thus, FIG. 19B shows the branching unit UD of FIG. 19A split into branching unit UD1 and branching unit UD2.

Figure 19B:
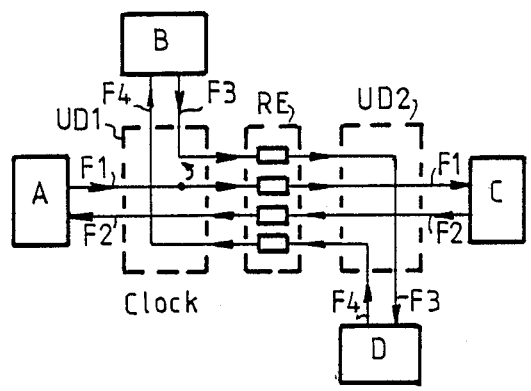
FIG. 19B shows a first method of providing such interconnection in accordance with the invention.

The present invention may firstly be implemented by inserting a limited number of repeater-interchangers RE between the two adjacent branching units UD1 and UD2 as shown in FIG. 19B. Clock information required for overall synchronization can therefore be interchanged, e.g. at branching unit UD1.

Figure 20:
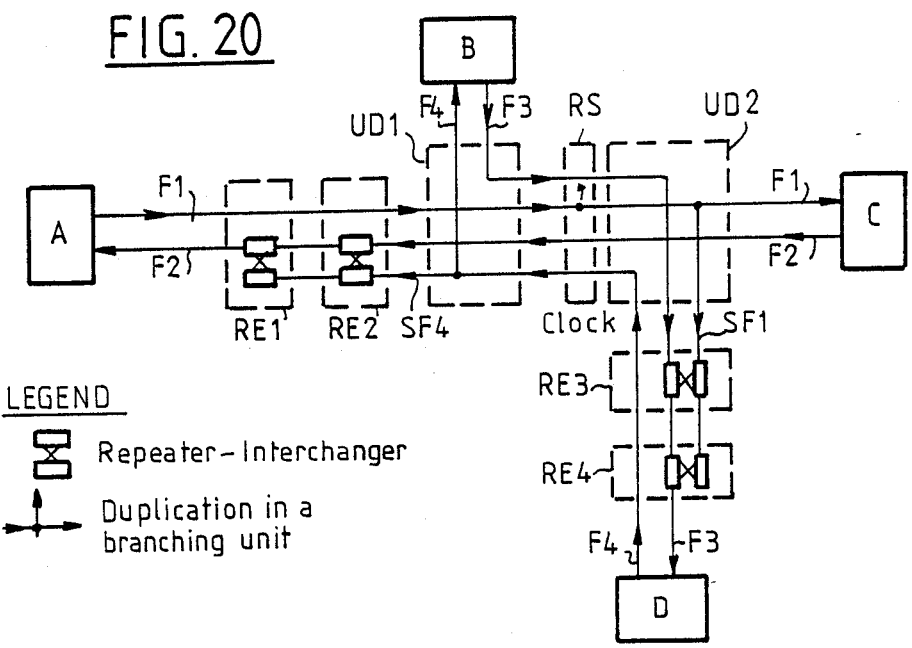
FIGS. 20 to 23 show four other methods of providing interconnections between four stations.

A more complex variant is shown in FIG. 20. This consists in duplicating the signal at one of the branching units, in this case branching unit UD1. It can be seen that fiber F4 communicates not only with station B, but also with a length of fibers F4 going towards A. Repeater-interchangers such as RE1 and RE2 allow information to be transmitted from D to A.

A synchronizing repeater RS is connected between the two branching units UD1 and UD2.

Interchanges in the opposite direction, from A to D can also be provided since the fiber F1 is interconnected in branching unit UD2 to a length of fiber SF1. This is in communication via repeater-interchangers RE3 and RE4 with fiber F3.

The general clock information coming from station A is communicated to station C via fiber F1. It is communicated to station D via synchronizing repeater RS and fiber F3. And station A communicates it in turn to station B over fiber F4.

Figure 21:
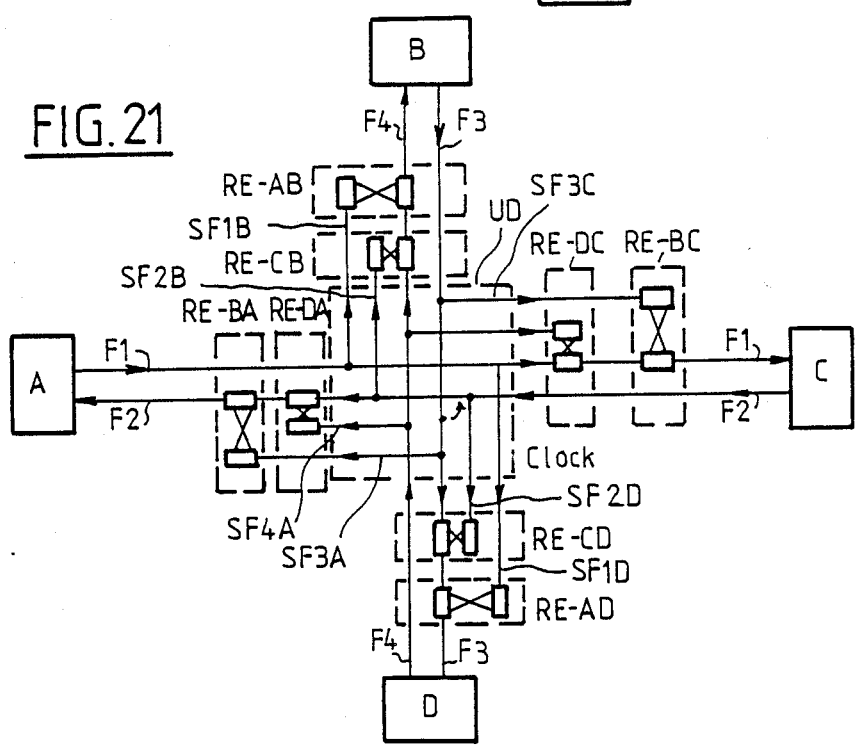

In practice, if communications AD have n channels at base rate d, then 2n repeater-interchangers are inserted in an interchange device, as shown diagrammatically in FIG. 20. In addition to base links between A and C and also between B and D, the FIG. 20 circuit provides both-way communications between A and D. It is easy to obtain communications of the type AB, BC, and CD, by reduplicating the circuit as shown in FIG. 21. All that is required, each time, is that two lengths of fiber, e.g. SF3A and SF4A leave the fibers F3 and F4 to run parallel to the fiber F2 towards station A. In order to assist in understanding the circuit of FIG. 21 and the following circuits, the repeater-interchangers are designated by the letters RE followed by a hyphen and then by the links to which they belong, in the order departure station, destination station, together with the symbol & if a plurality of links are provided. A single repeater-interchanger is shown for each link. In practice, each link requires a number thereof which depends on the number of signal segments to be interchanged.

Naturally, it is important to perform the fiber duplication operation on a segment of fiber which lies upstream from the required interchange operations.

More generally, each time the fibers between which interchangers are required do not coexist over a sufficient length for the desired number of repeater-interchangers to be inserted, an additional fiber or length of fiber should be inserted in the cable parallel to the fiber to which the transfer is to take place, said additional fiber or length of fiber carrying the duplicated signal. The length of the length of fiber must be sufficient to enable the necessary additional number of repeater-interchangers to be inserted. This number is equal to the number of signals that are to be interchanged since useful interchange can take place only in the direction from the additional fiber towards the main fiber which coexists therewith.

Figure 22:
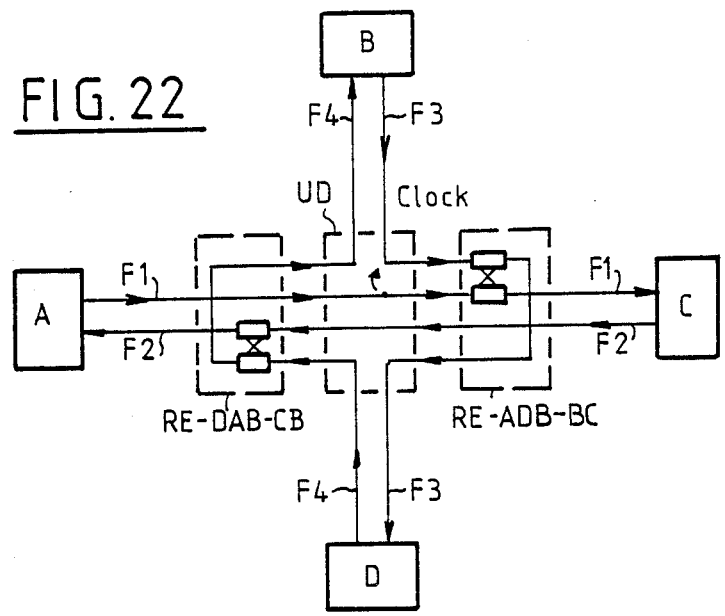

Another solution consists in adding a loop on some of the fibers. These looped fibers then run over a chosen distance from the branching unit to which the fibers with which interchange is to take place are connected, prior to returning to the branching unit in order to regain the cable going to their final destination. This is shown in theory in FIG. 22. It can be observed that the fiber F3 runs parallel to fiber F1 over a certain number of repeaters RE-AD&BC, prior to regaining the central branching unit UD and going from there towards station D. Similarly, fiber F4 leaving D goes, after regaining the central branching unit UD through a certain number of repeaters RE-DA&CB prior to returning to the branching unit UD and going on to its final destination which is station B.

Figure 23:
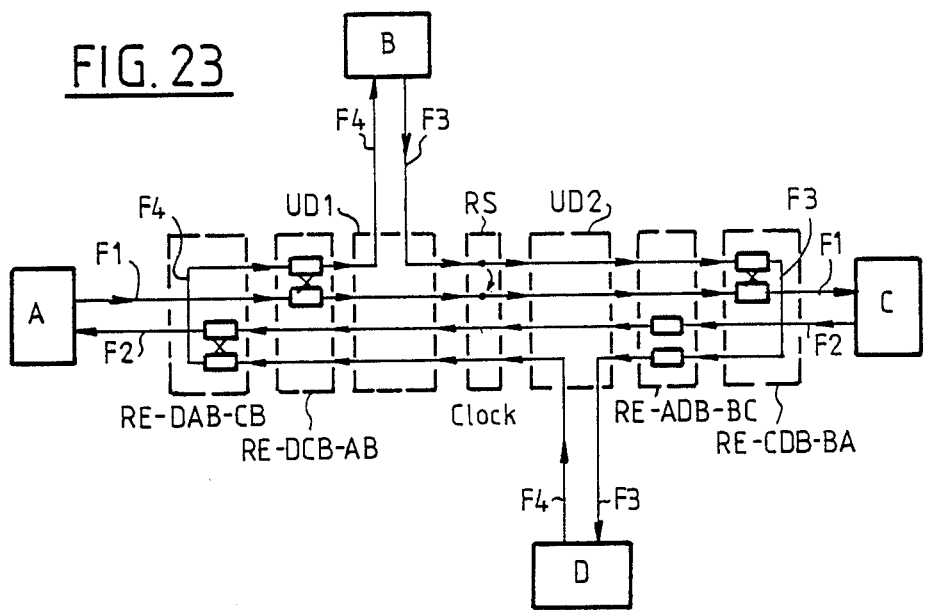

In FIG. 23, the circuit is extended to allow all possible interchanges between all four stations. The central branching unit UD is now split into two units UD1 and UD2 which are separated by a synchronizing repeater RS. On either side of the two branching units there are not only repeaters of the type RE-DA&CB and RE-AD&BC, but also repeater-interchangers of the type RE-DC&AB and repeater-interchangers of the type of RE-CD&BA.

This solution has the advantage of ensuring that information is kept secret since no station receives a signal which is not intended for that station. Although, it may sometimes require a greater length of additional looped fiber, duplication within the branching units is avoided. And since most of the repeater-interchangers interchange two signals, it is possible to get close to the optimum number of repeater-interchangers, which can be calculated as shown in outline above.

For instance, it may be observed that the additional fibers necessary for enabling the required number of repeater-interchangers to be inserted may also be provided by the additional fibers whose purpose is to ensure security by redundancy, or by pairs of fibers which are partially occupied in some cable sections.

Redundancy fibers would naturally cease to provide interchange functions when operating in their security role. Direct parallel paths would then be re-established in the repeater-interchangers concerning the redundancy fibers, and this may be acceptable on a temporary basis in some installations.

An arbitrary network for conveying predetermined traffic between a plurality of stations may be constituted by suitably combining circuits as described above.

Figure 24:
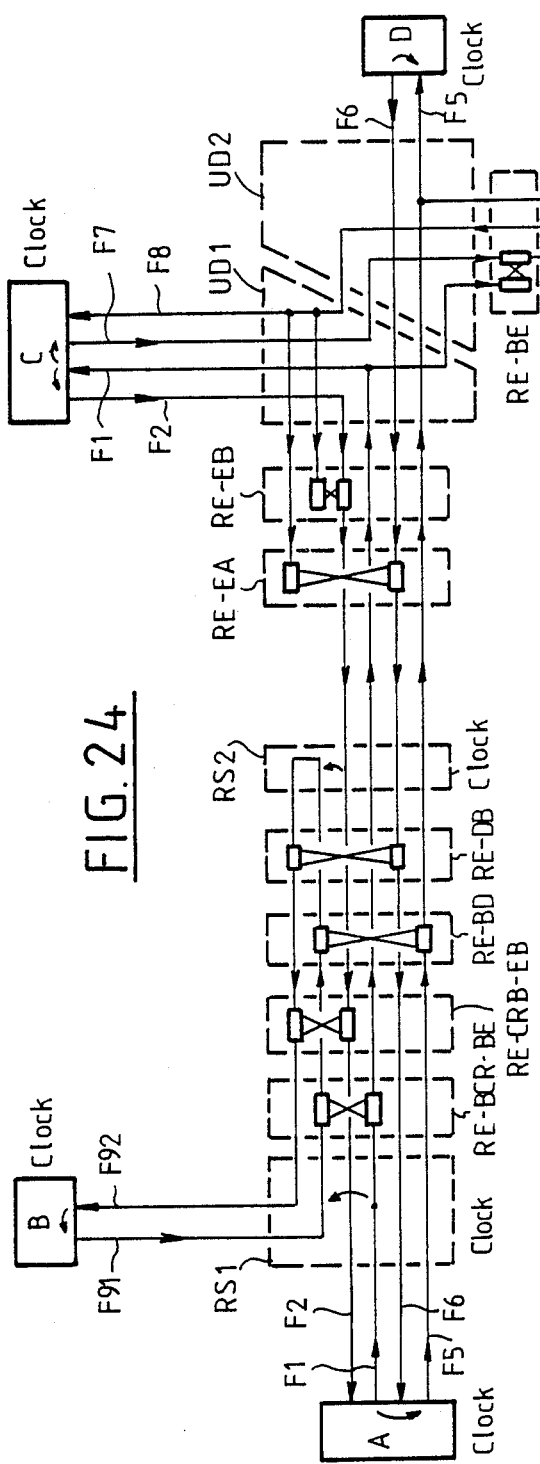
FIGS. 24 and 24A show fifth and sixth methods of obtaining interconnection between four stations.

FIG. 24 shows one possible example. Station A communicates over fibers F1 and F2 with station C to which it also conveys a clock rate. Station A also communicates over fibers F5 and F6 with station D to which it likewise communicates the clock. Station C communicates over fibers F7 and F8 with station E to which it also provides the clock. Station B operates over a closed loop fiber F91, F92 and communicates via repeater-interchangers with fibers F1, F2, F5, and F6. It also has two synchronizing repeaters RS1 and RS2 provided therefor.

Stations C, D, and E are interconnected by two adjacent branching units UD1 and UD2. Appropriate copies are provided on lengths of fiber in order to allow interchanges in both directions between the fibers F7 and F8 and firstly the fibers F2 and F6 and secondly the fibers F1 and F5.

Careful observation of the drawing will show that the clock signal flows through all of the fibers.

The FIG. 24 circuit makes use of the teaching described with reference to FIGS. 15 to 23. It may be optimized by using redundancy fibers or pairs of partially used fibers in some cable sections, as mentioned above.

Figure 24A:
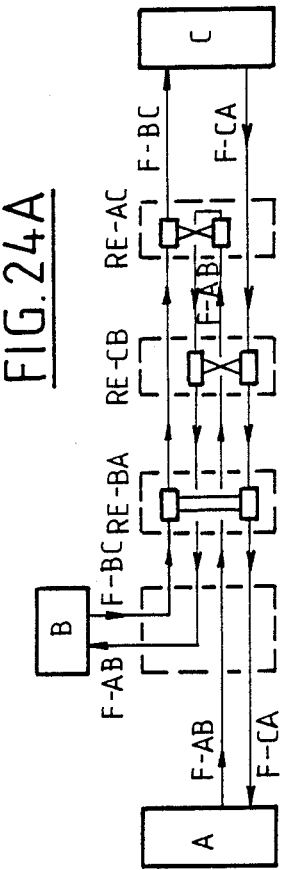

Finally, a particularly simple example of a network providing all possible interconnections between three stations is shown in FIG. 24A. The interconnections AB, BC, and CA are provided directly by fibers F-AB, F-BC, and F-CA. Fiber F-AB coexists by virtue of a loop with fibers F-BC and F-CA, thereby allowing interconnections BA, CB, and AC to be provided by means of repeater-interchangers RE-BA, RE-CB, and RE-AC. The network is synchronized from a master clock situated in any one of the stations by virtue of the fiber loop F-AB, F-BC, and F-CA.

We now return to providing redundancy in the repeater-interchangers themselves.

The behavior of two repeater-interchangers connected in cascade has already been examined with reference to FIG. 11, or more precisely the behavior of two interchanger devices connected in cascade within a single repeater-interchanger has been examined said repeater-interchanger being provided with parallel direct paths.

Figure 25A:
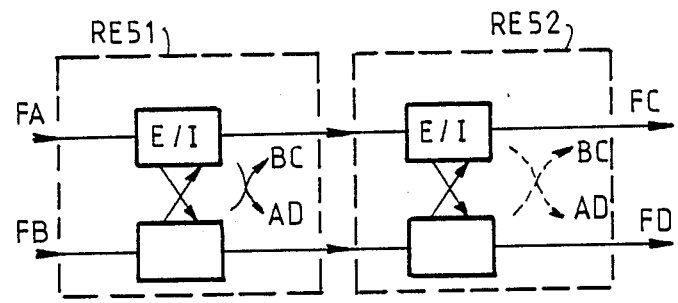
FIGS. 25A and 25B show another method of providing redundancy between repeaters/interchangers in accordance with the invention.

The circuit of FIG. 25A shows that it is also possible to put two repeater-interchangers provided with respective transmit and receive amplifiers (not shown in this case) in cascade. FIG. 25A relates to the case where the fibers FA and FC and also the fibers FB and FD are all same-direction fibers.

It is recalled that under normal conditions, if synchronization takes place internally on the signal as soon as the upstream repeater-interchanger RE51 has gained synchronization, then the following repeater-interchanger(s) RE52 no longer receive the signal on which they should be synchronized and must consequently be transparent to the signals to be interchanged. However, it is also possible to use remote control to ensure transmission over the direct parallel paths at any of the repeater-interchangers if they are to be used as mere repeaters.

Figure 25B:
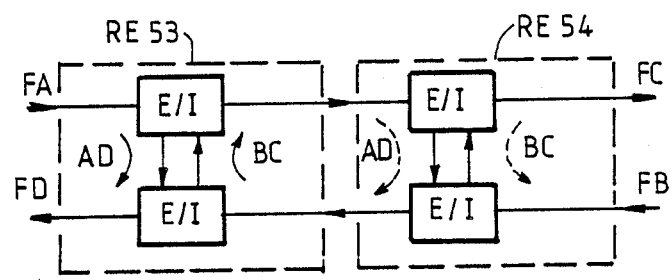

Turning now to FIG. 25B, it can be seen that the same applies for repeater-interchangers RE53 and RE54 connected in parallel between opposite direction fibers, i.e. FA-FC and FB-FD. In this case, if internal synchronization is used as described with reference to FIG. 8, than that one of the two repeater-interchangers RE53 and RE54 which synchronizes first is the one that remains in operation thereafter.

However, if synchronization is performed independently, as described with reference to FIG. 2, there is a danger that the system will lock up in a situation where it is looped back on itself. This may also happen in the event of a fault in the synchronization system of the type examined above.

When the fibers are opposite-direction fibers, it is therefore considered preferable, at present, to select that one of the two repeater-interchangers which is to be in operation by remotely controlling the use of the direct parallel paths in the other repeater-interchangers which act on the same signals.

It can now be seen that this explains why parallel paths are provided in the FIG. 11 circuit where two interchange modules are connected in cascade within a single repeater-interchanger.

Figure 26:
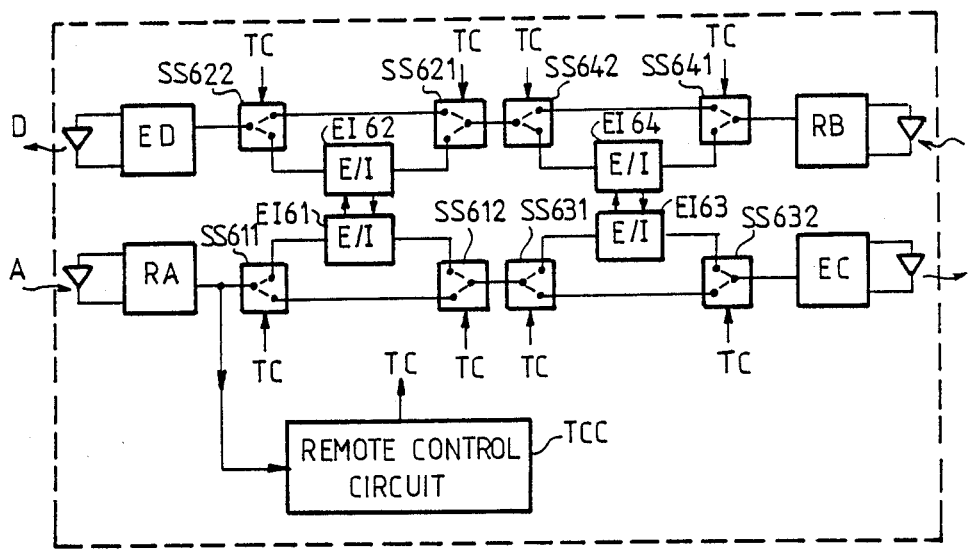
FIG. 26 shows a variant of the invention, which is also applicable to providing redundancy between apparatuses.

FIG. 26 is a circuit comparable to that of FIG. 11, but in which the two fibers are opposite-direction fibers and in which the possibility is provided of isolating each of the two pairs of repeater-interchangers which are referenced, in this case EI61 & EI62 and EI63 & EI64. Members SS611, SS612, SS621, SS622, SS631, SS632, SS641, and SS642 are security switches receiving remote control signals TC from a remote control circuit TCC. In this case, the remote control circuit TCC is assumed to receive information from the fiber that comes from station A, i.e. a signal passing through amplifying receiver RA.

It is often advantageous to combine redundancy between pairs of fibers with redundancy between repeater-interchangers. This situation has already been mentioned with reference to FIG. 13. Redundant repeater-interchangers fitted with diversion and looping matrices can then be constituted by one of the types of redundant repeater-interchangers described so far.

In the present description, it has been indicated how the various sections of a network can be synchronized using synchronizing repeaters (or clock-transferring branching units) which allow clock information to transit through the entire network.

However, such synchronizing repeaters can be used for a different purpose.

It has been mentioned above, in particular with reference to FIG. 2, that interchange devices (pairs of drop and insert switches) within repeater-interchangers include buffer memories for storing the message to be inserted until it can take up a position released by a dropped message.

There are two reasons for this: firstly differences in position between the two signals need compensating within the resultant signal at base data rate d. However, another purpose is to compensate for variations in the propagation times of the signals in reaching the branching units.

Figure 27:
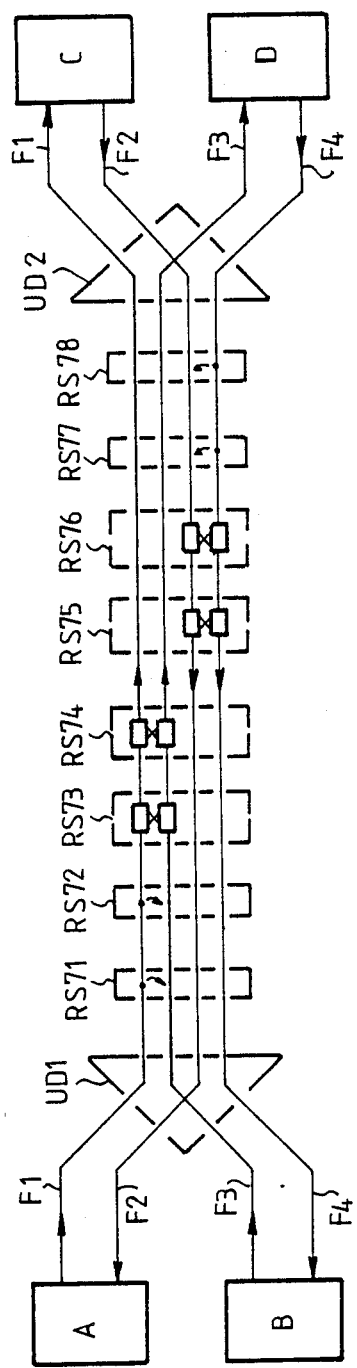
FIG. 27 is a diagram of another example of a four station network in accordance with the invention.

This second function may also be performed, at least in part, by synchronizing repeaters placed upstream from the interchange devices, as shown in FIG. 27.

This figure relates to four optical fibers F1 and F2 between stations A and C and F3 and F4 between stations B and D. One branching unit UD1 is provided at the West and another UD2 at the East. Repeater-interchangers, per se such as RE73 and RE74 or RE75 and RE76 are bracketed between synchronizing repeaters RS71 and RS72 at the West and RS77 and RS78 at the East.

This makes it possible to simplify implementation of the repeater-interchangers by reducing the size required for the buffer memory. Also, for given size, it makes it possible to limit the danger of a buffer memory becoming saturated, and consequently serves to improve the transmission performance of the link.

The location and the number of synchronizing repeaters shown in FIG. 27 are given merely by way of example. In practice they will be adapted to requirements.

In this sense, the present invention is not limited to the embodiments described, but extends to any variant included within the scope of the accompanying claims.

I claim:

1. An optical fiber cable transmission apparatus for distributing an underwater multiplexing function by enabling traffic reconfiguration comprising a plurality of repeater-interchanger modules, each said repeater-interchanger module enclosed in a housing and interchanging frame segments between at least two selected fibers of said cable, each said repeater-interchanger module comprising:

means for receiving frame segments from groups of signal streams on fibers in said optical fiber cable;

means for converting said received frame segments to electrical signals for processing;

means for converting processed electrical signals to optical frame segments;

means for transmitting said optical frame segments to fibers in said cable;

at least one interchange module associated with a synchronization means, said interchange module having electrical means for transferring data between said selected fibers by extracting segments from a first group of signal streams of a useful signal and for replacing said extracted segments with segments from a second group of signal streams.

2. Apparatus according to claim 1, wherein the two fibers subjected to interchange by a repeater-interchanger module are same-direction fibers.

3. Apparatus according to claim 1, wherein the two fibers subjected to interchange by a repeater-interchanger module are opposite-direction fibers.

4. Apparatus according to claim 1, wherein a said interchange module includes means for remaining at rest so long as synchronization has not been established.

5. Apparatus according to claim 1, wherein a said interchange module includes means for by-passing said module, on command, by direct parallel paths.

6. Apparatus according to claim 1, comprising pairs of said interchange modules switchably and redundantly connected to operate on the same fibers.

7. Apparatus according to claim 1, comprising a diversion matrix wherein a said repeater-interchanger module is fitted with at least one pair of redundant fibers arranged to allow the signals passing over at least some other fibers to be diverted over said redundant fibers the inputs and outputs of at least one of the interchange modules being switchable to a same direction redundant fiber.

8. Apparatus according to claim 1, wherein a said interchange module operates on data segments relating to an intermediate transmission data rate lying between a high data rate and a base data rate of the signal streams.

9. Apparatus according to claim 8, wherein a said interchange module operating at the intermediate data rate is connected in parallel with another said interchange module operating at the base data rate.

10. Apparatus according to claim 1, including, in the vicinity of a landing branching network and on the sea side thereof, a length of fiber and a fiber which are respectively connected by the branching unit to two different land stations, together with at least one repeater-interchanger module connected between the length of fiber and the fiber.

11. Apparatus according to claim 1, including at least one branching unit having means for duplicating the incident signal towards two different stations, both of said stations receiving the same clock frequency.

12. Apparatus according to claim 11, wherein, in the vicinity of said branching unit, at least one said repeater-interchanger module is provided to extract messages which do not concern a said station and to replace said messages by a pure clock signal.

13. Apparatus according to claim 1, further comprising a plurality of stations wherein said signals coming from a first station are returned to said station, after being stored, at a clock frequency which is taken a station different from said first station.

14. Apparatus according to claim 13, wherein the signal is returned to the same station after said signal has passed through repeater-interchanger modules which provide message interchange with two other stations.

15. Apparatus according to claim 1 further comprising a fiber passing through a branching unit said fiber being extended by a fiber loop forming a go and a return path from said branching unit and coexisting with other fibers.

16. Apparatus according to claim 15, wherein the fiber loop passes through one or more repeater-interchanger modules said module interchanging messages between the loop and other fibers.

17. Apparatus according to claim 1, wherein at least some of the repeater-interchangers are synchronized on one of the signals incident thereat.

18. Apparatus according to claim 1, wherein at least some of the repeater-interchangers are synchronized by remote control means 19. Apparatus according to claim 1 comprising at least one synchronizing repeater arranged to compensate at least in part for delays due to signal propagation times.

20. A method of reconfiguring traffic on an optical fiber cable comprising the steps of:
receiving optical signals on fibers in said optical fiber cable;
converting said received optical signals to electrical signals in a plurality of repeater-interchanger modules;
interchanging frame segments between at least two selected fibers of said cable, said interchanging further comprising the steps of:
(a) synchronously extracting segments from a first group of signal streams of a frame of a useful signal; and
(b) replacing said extracted segments with segments from a second group of signal streams;
converting said segments to optical form; and
transmitting said segments in optical form to said fibers in said cable.

21. The method of claim 20 further comprising the step of interchanging said frame segments in at least one interchange module.

22. The method of claim 21 further comprising the step of maintaining a said interchange module at rest so long as synchronization is not established.

23. The method of claim 21 further comprising the step of bypassing a said interchange module on command using direct parallel paths.

24. The method of claim 21 further comprising connecting pairs of interchange modules switchably and redundantly to operate on the same fibers.

25. The method of claim 21 further comprising the steps of:
fitting at least one pair of redundant fibers in a said repeater-interchanger module;
passing the signals travelling over at least some other fibers over said redundant fibers through a diversion matrix; and
arranging inputs and outputs of at least one of said interchange modules to be switchable to a same direction redundant fiber.

26. The method according to claim 21 further comprising the steps of:
connecting a length of fiber and a fiber by a branching unit to two different land stations;
connecting at least one repeater-interchanger module between the length of fiber and the fiber; and
forming such connections in a vicinity of a landing branching network and on the C side thereof.

27. The method according to claim 21 further comprising the step of returning signals from a first station to said first station after being stored at a clock frequency which is taken from a station different from said first station.

28. The method according to claim 21 further comprising the step of returning a signal to a first station after said signal has passed through repeater-interchange modules which provide message interchange with two other stations.

29. The method according to claim 21 further comprising the step of passing a fiber through a branching unit and extending said fiber by a fiber loop forming a go and return path from said branching unit and coexisting with other fibers.

30. The method according to claim 21 further comprising the step of synchronizing said repeater-interchanger modules by remote control means.

31. The method according to claim 20 further comprising the step of operating on data segments at an intermediate data transmission rate line between a high data rate and a base data rate of the signal streams.

32. The method according to claim 20 further comprising the step of duplicating in a branching unit an incident signal towards two different stations receiving the same clock frequency.

33. The method according to claim 32 further comprising the step of extracting messages which do not concern a said station and replacing said messages by a pure clock signal in at least one said repeater-interchanger module located in a vicinity of said branching unit.

34. The method according to claim 20 further comprising the step of synchronizing said repeater-interchange modules on a signal incident thereat.

35. The method according to claim 20 further comprising the step of compensating at least in part for delays due to signal propagation times.

* * * * *